United States Patent
Ishinoda (10) Patent No.: US 12,539,842 B2
(45) Date of Patent: Feb. 3, 2026

(54) PARKING ASSIST SYSTEM AND PARKING ASSIST METHOD

(71) Applicant: Faurecia Clarion Electronics Co., Ltd., Saitama (JP)

(72) Inventor: Makoto Ishinoda, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 206 days.

(21) Appl. No.: 17/748,169

(22) Filed: May 19, 2022

(65) Prior Publication Data

US 2022/0379877 A1 Dec. 1, 2022

(30) Foreign Application Priority Data

May 26, 2021 (JP) ................................. 2021-088612

(51) Int. Cl.
*B60W 30/06* (2006.01)
*B60W 30/095* (2012.01)

(52) U.S. Cl.
CPC .......... *B60W 30/06* (2013.01); *B60W 30/095* (2013.01); *B60W 2520/04* (2013.01); *B60W 2520/06* (2013.01); *B60W 2554/80* (2020.02)

(58) Field of Classification Search
CPC .............. B60W 30/06; B60W 30/095; B60W 2554/80; B60W 2520/04; B60W 2520/06
USPC ......................................................... 701/41
See application file for complete search history.

(56) References Cited

U.S. PATENT DOCUMENTS

| | | | | |
|---|---|---|---|---|
| 9,862,416 | B2 * | 1/2018 | Imai | B60K 31/0008 |
| 10,077,045 | B2 * | 9/2018 | Kiyokawa | G05D 1/0212 |
| 10,800,404 | B2 * | 10/2020 | Kato | G05D 1/0212 |
| 11,155,257 | B2 * | 10/2021 | Tsuge | B62D 15/027 |

(Continued)

FOREIGN PATENT DOCUMENTS

| | | |
|---|---|---|
| DE | 112019003322 T5 | 3/2021 |
| JP | 2018-176909 A | 11/2018 |

(Continued)

OTHER PUBLICATIONS

French Search Report issued on Mar. 13, 2023 in corresponding French patent application No. FR2204975.

(Continued)

*Primary Examiner* — Kurt Philip Liethen
*Assistant Examiner* — Anthony Donald Taylor, Jr.
(74) *Attorney, Agent, or Firm* — IP Business Solutions, LLC (57) ABSTRACT

A parking assist system comprises: a backward position determining unit for changing, upon inputting of a notification that the travel of the vehicle has stopped in a forward route, the starting point of a reverse route to the stopping point wherein travel of the vehicle has stopped, and, if the vehicle has traveled along the backward route wherein the starting point has been changed to the stopping position, identifies a backward position wherein the vehicle can be reversed; a control information generating unit for generating control information for causing the vehicle to travel from the stopping position to the backward position; and a route generating unit for generating a second parking route, for causing the vehicle to travel to the parking position, based on the state of surroundings, acquired by a state acquiring unit, when the vehicle travels to the backward route.

6 Claims, 8 Drawing Sheets

(56) References Cited

U.S. PATENT DOCUMENTS

| | | | | |
|---|---|---|---|---|
| 11,396,288 | B2* | 7/2022 | Tashiro | B60W 30/09 |
| 2008/0158011 | A1* | 7/2008 | Yamanaka | B62D 15/0275 |
| | | | | 701/28 |
| 2010/0049402 | A1* | 2/2010 | Tanaka | B60R 1/26 |
| | | | | 701/41 |
| 2010/0089677 | A1* | 4/2010 | Tanaka | B62D 15/027 |
| | | | | 180/204 |
| 2010/0283634 | A1* | 11/2010 | Krautter | B62D 15/0275 |
| | | | | 340/932.2 |
| 2011/0087406 | A1* | 4/2011 | Barth | B60Q 1/48 |
| | | | | 701/41 |
| 2011/0273310 | A1* | 11/2011 | Kadowaki | B62D 15/0285 |
| | | | | 701/25 |
| 2012/0013485 | A1* | 1/2012 | Pampus | B60W 50/14 |
| | | | | 340/932.2 |
| 2012/0185113 | A1* | 7/2012 | Pampus | B62D 15/028 |
| | | | | 701/1 |
| 2013/0166190 | A1* | 6/2013 | Ikeda | B62D 15/027 |
| | | | | 701/400 |
| 2017/0259850 | A1* | 9/2017 | Yamashita | B62D 6/00 |
| 2020/0331462 | A1* | 10/2020 | Kurosawa | B60W 30/06 |
| 2020/0369262 | A1* | 11/2020 | Suzuki | G06V 20/586 |
| 2021/0086756 | A1 | 3/2021 | Hasejima et al. | |
| 2021/0213937 | A1* | 7/2021 | Imai | B62D 15/0285 |
| 2021/0213941 | A1* | 7/2021 | Fukasawa | B62D 15/0285 |
| 2021/0402985 | A1* | 12/2021 | Matsuda | B60T 7/22 |

FOREIGN PATENT DOCUMENTS

| | | | | |
|---|---|---|---|---|
| JP | 2019-051822 A | | 4/2019 | |
| JP | 2020-011559 A | | 1/2020 | |
| JP | 2020-175864 A | | 10/2020 | |
| JP | 2021-062754 A | | 4/2021 | |
| JP | 2021062658 A | * | 4/2021 | ........... B60W 30/06 |

OTHER PUBLICATIONS

Japanese Office Action mailed by Japanese Patent Office dated on Mar. 18, 2025 in corresponding Japanese patent application No. 2021-088612.

* cited by examiner

FIG. 8

PARKING ASSIST SYSTEM AND PARKING ASSIST METHOD

CROSS-REFERENCE TO RELATED APPLICATIONS

The present application claims priority under 35 U.S.C. § 119 to Japanese Patent Application No. 2021-088612 filed on May 26, 2021. The content of the application is incorporated herein by reference in its entirety.

BACKGROUND OF THE INVENTION

Field of the Invention

The present invention relates to a parking assist system the parking assist method.

Description of the Related Art

There are known technologies for stopping travel of a vehicle midway through a parking route, to recalculate the parking route, when it is known that an obstacle exists in the parking route.

For example, Patent Document 1 discloses a parking assist system wherein, if an obstacle exists in a parking route, a parking route to a parking space from a stopped position of a vehicle is calculated and set again as a new parking route.

PRIOR ART LITERATURE

Patent References

[Patent Reference 1] Japanese Unexamined Patent Application Publication 2018-176909

SUMMARY OF THE INVENTION

Problem Solved by the Present Invention

However, there have been cases wherein, depending on the stopped position when travel of a vehicle has been stopped midway on a parking route, it has not been possible to generate a parking route.

In contemplation of the situation described above, the object of the present invention is to provide a parking assist system and parking assist method that improve the convenience for the user by improving the parking route generation ratio.

SUMMARY OF THE INVENTION

In order to achieve the object set forth above, the parking assist system according to the present invention comprises:

an input/output interface configured to connect to an outside system, acquire information from the outside the system and output information to the outside system;

a state acquiring unit configured to acquire a state of surroundings of a vehicle and location information for the vehicle through the input/output interface;

a parking position determining unit configured to determine a parking position for parking the vehicle based on the state of surroundings acquired by the state acquiring unit;

a route generating unit configured to generate a first parking route, including a forward route and a backward route, for the vehicle to move to the parking position determined by the parking position determining unit;

a control information generating unit configured to generate control information for the vehicle to travel according to the first parking route, and output the generated control information to the input/output interface;

a backward position determining unit configured to change the starting point of the backward route to the stopping position wherein the travel of the vehicle stopped when a notification that travel of the vehicle has stopped in the forward route has been inputted through the input/output interface, and determine a backward position wherein the vehicle can be reversed if the vehicle has moved along the backward route wherein the starting point of the backward route was changed to the stopping position, wherein:

the control information generating unit generates control information for moving the vehicle from the vehicle stopping position to the backward position; and when the vehicle has traveled to the backward route, the route generating unit executes generation of a second parking route, by which the vehicle is to move to the parking position, based on the state of surroundings acquired by the state acquiring unit.

Effects of the Invention

The present invention enables an improvement in convenience for the user by improving the parking route generation ratio, to improve the convenience for the user.

DETAILED DESCRIPTION OF THE INVENTION

An embodiment will be explained below in reference to the appended drawings.

Figure 1:
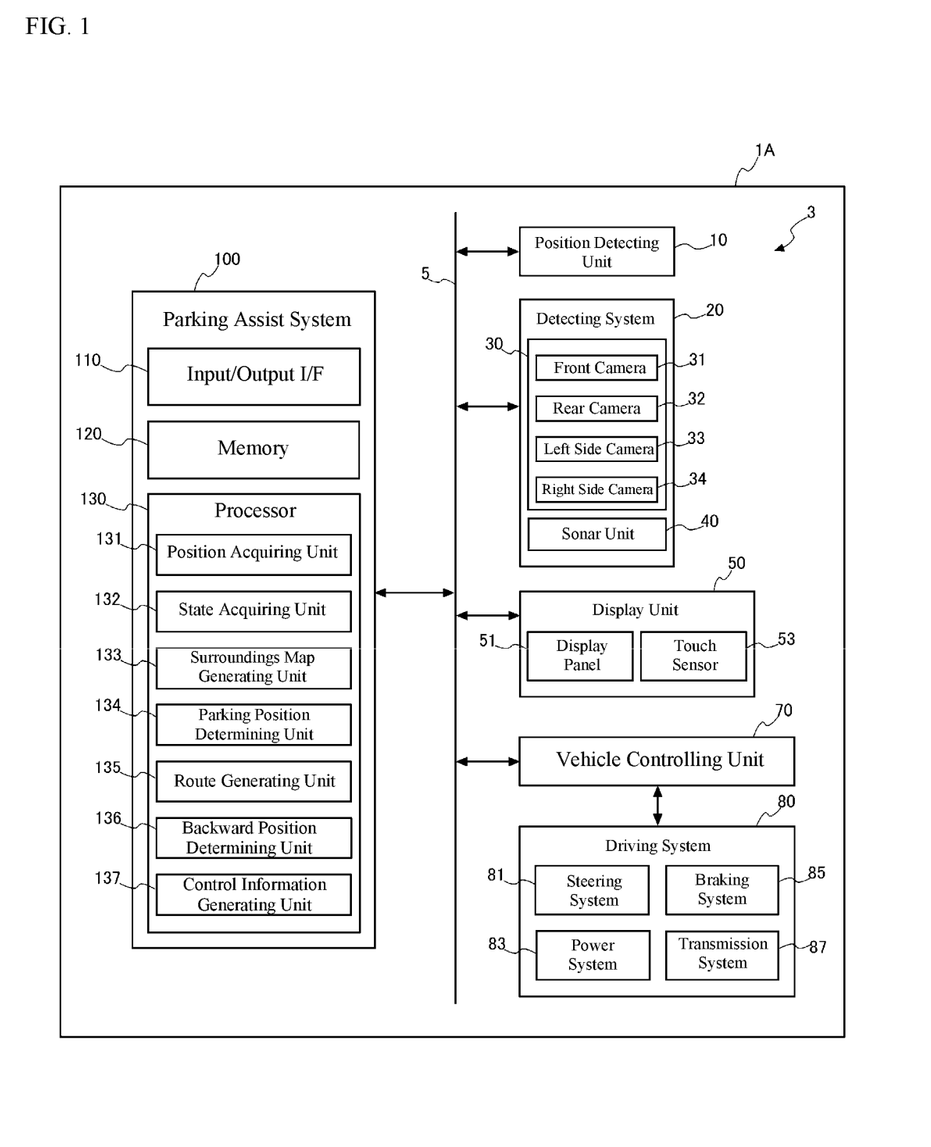
FIG. 1 is a block diagram showing a structure of an onboard system.

FIG. 1 is a block diagram showing a structure of an onboard system 3. In the below, a vehicle in which the onboard system 3 is mounted will be termed "the vehicle 1A."

The onboard system 3 comprises a position detecting unit 10, a detecting system 20, a display unit 50, a vehicle controlling unit 70, a driving system 80, and a parking assist system 100.

The position detecting unit 10 detects the position of the vehicle 1A. The position detecting unit 10 comprises a GNSS (Global Navigation Satellite System) receiver and a processor (neither of which are shown). The GNSS receiver receives signals transmitted from satellites. The processor calculates the latitude and longitude, which are location information for the vehicle 1A, based on the signals received by the GNSS receiver, and calculates the bearing of the vehicle 1A based on differences in calculated location information. The position detecting unit 10 outputs, to the parking assist system 100, the location information and azimuth information calculated for the vehicle 1A.

The detecting system 20 comprises a plurality of sensors. The detecting system 20 according to the present embodiment comprises, as sensors, an imaging unit 30 that has a plurality of cameras and sonar units 40.

While in the present embodiment a case wherein the detecting system 20 comprises cameras and sonar, the sensor of the detecting system 20 is not limited to cameras and sonar. For example, radar or LiDAR (Laser Imaging Detection and Ranging), able to measure distance to objects using radio signals, light, or the like, may be provided in the detecting system 20. The detecting system 20 outputs, to the parking assist system 100, the images captured by the imaging unit 30 and the sensor data of the sonar unit 40, as surroundings information that indicates the state of the surroundings.

The imaging unit 30 comprises a front camera 31 for imaging forward of the vehicle 1A, a rear camera 32 for imaging rearward of the vehicle 1A, a left side camera 33 for imaging toward the left side of the vehicle 1A, and a right side camera 34 for imaging toward the right side of the vehicle 1A. These cameras are each equipped with image sensors such as, for example, CCDs (Charge-Coupled Devices) or CMOS (Complementary Metal-Oxide-Semiconductor) sensors, or the like, and with data processing circuits for generating images from the states of light reception of the image sensors. In the imaging units 30, the viewing angles are adjusted so as to enable imaging of a range of 360°, centered on the vehicle 1A, through the four cameras. The front camera 31, the rear camera 32, the left side camera 33, and the right side camera 34 each carries out imaging of the respective imaging range at a prescribed frame rate, to generate captured images. The front camera 31, the rear camera 32, the left side camera 33, and the right side camera 34 output the generated captured images to the parking assist system 100.

The sonar units 40 are mounted at a plurality of locations on the vehicle 1A, such as toward the front, toward the back, the left side, the right side, and the like, and use ultrasound to detect objects that are present in the surroundings of the vehicle 1A. Specifically, the sonar unit 40 detects the location of an object and the distance to the object.

The display unit 50 comprises a display panel 51 and a touch sensor 53. A liquid crystal display or an organic EL display, for example, is used in the display panel 51. The touch sensor 53 uses a sensor of a commonly known method, such as a resistance film method, an electrostatic capacitance method, or the like. The touch sensor 53 detects a touch operation that is performed on the display, 51, to generate a position signal indicating the location of the detected touch operation. The touch sensor 53 outputs, to the parking assist system 100, operation information signal that includes the generated position signal.

The vehicle controlling unit 70 is a computer device such as, for example, an ECU (Electronic Control Unit), and is a unit for controlling the driving system 80 that is mounted in the vehicle 1A. The driving system 80 includes a steering system 81, a power system 83, a braking system 85, and a transmission system 87. The vehicle controlling unit 70 is connected to the steering system 81, the power system 83, the braking system 85, and the transmission system 87, and the parking assist system 100 through a communication bus 5 that follows a standard such as Ethernet®, CAN (Controller Area Network), LIN (Local Interconnect Network), or the like. The vehicle controlling unit 70 controls the steering system 81, the power system 83, the braking system 85, and the transmission system 87 in accordance with control information inputted from the parking assist system 100.

The steering system 81 is a system that includes an actuator for steering the steering wheel of the vehicle 1A.

The power system 83 is a system that includes an actuator for adjusting the driving force on the drive wheels of the vehicle 1A. This actuator corresponds to a "throttle actuator," if the power source of the vehicle 1A is an engine, or corresponds to the "motor" if the power source is a motor.

The braking system 85 controls the braking system that is provided in the vehicle 1A, based on information from the parking assist system 100, and includes actuators for controlling the braking forces that are applied to the wheels of the vehicle 1A.

The transmission system 87 is a system that includes a transmission and an actuator. The transmission system 87 drives the actuator to control the shift position of the transmission, to shift the reduction ratio of the transmission and to shift the vehicle 1A between forward and backward.

When travel of the vehicle 1A becomes stopped midway in a parking route, the vehicle controlling unit 70 outputs a stopped notification to the parking assist system 100.

If travel of the vehicle 1A was stopped by an operation by the driver, the vehicle controlling unit 70 stops travel of the vehicle 1A. Moreover, the vehicle controlling unit 70, through sensor data and/or captured images inputted by the detecting system 20, evaluates whether or not an obstacle exists in the travel route of the vehicle 1A. If an obstacle exists in the travel route of the vehicle 1A, the vehicle controlling unit 70 controls the braking system 85 to stop travel of the vehicle 1A.

Additionally, when control of the driving system 80 in accordance with the control information inputted from the parking assist system 100 has been completed, the vehicle controlling unit 70 outputs a completion notification to the parking assist system 100.

The parking assist system 100 is a computer system comprising an input/output interface 110, a memory 120, and a processor 130. The parking assist system 100 may be structured comprising, along with these devices, a storage device such as an HDD (Hard Disk Drive), an SSD (Solid-State Drive), or the like. In the below, "interface" will be abbreviated "I/F."

The input/output I/F 110 is connected to the communication bus 5, to acquire information from outside systems and to output information to outside systems, through communication bus 5 and for exchanging data with outside systems that are connected to the communication bus 5. The external systems include the position detecting unit 10, the detecting system 20, the display unit 50, and the vehicle controlling unit 70.

The memory 120 is structured from a ROM (Read-Only Memory), a RAM (Random Access Memory), or the like. Moreover, the memory 120 may be structured from a non-volatile semiconductor memory such as a flash memory. The memory 120 stores a computer program to be executed by a processor 130, data that is to be processed when the processor 130 executes the computer program, and/or data that is the result of processing. Moreover, the memory 120 stores the captured images that are captured by the imaging unit 30, the sensor data outputted by the sonar units 40, and the like.

The processor 130 is structured from a CPU (Central Processing Unit), an MPU (Microprocessor Unit), or the like.

The parking assist system 100 comprises, as functional structures, a position acquiring unit 131, a state acquiring unit 132, a surroundings map generating unit 133, a parking position determining unit 134, a route generating unit 135, a backward position determining unit 136 and a control information generating unit 137. These functional structures are functions achieved through carrying out calculations by the processor 130 executing a computer program.

The location information and azimuth information for the vehicle 1A, calculated by the position detecting unit 10, are inputted into the position acquiring unit 131. The position acquiring unit 131 uses a well-known dead reckoning technique to correct the location information and/or azimuth information that has been inputted by the position detecting unit 10. The position acquiring unit 131 outputs the corrected location information and azimuth information to the surroundings map generating unit 133 and route generating unit 135.

The state acquiring unit 132 acquires surroundings information, through the input/output I/F 110, the captured images generated by the imaging unit 30. The state acquiring unit 132 stores temporarily, in the memory 120, the captured images that have been acquired by the imaging unit 30.

Moreover, the state acquiring unit 132 causes the sonar units 40 to execute sensing, to acquire as surroundings information, through the input/output I/F 110, the sensor data that are the detecting results by the sonar units 40. The state acquiring unit 132 stores temporarily, in the memory 120, the sensor data that have been acquired from the sonar units 40.

The surroundings map generating unit 133 generates a surroundings map, showing the state of the surroundings of the vehicle 1A, based on the location information and azimuth information, inputted from the position acquiring unit 131, and the captured images and sensor data stored in the memory 120. The surroundings map records, for example, positions of objects that are located around the vehicle 1A, the distances to those objects, the positions of parking spaces, such as white lines, or the like, that are painted on the surface of the parking lot, and the like. Other vehicles 1B, parked in parking spaces, structures, such as columns, of the parking lot, and the like, for example, are included in the objects that are recorded in the surroundings map. Because the lines of parking spaces are painted on the road surface with prescribed widths, regions corresponding to the widths of the white lines are detected as periodic distinctive features.

The parking position determining unit 134 references the surroundings map, generated by the surroundings map generating unit 133, to determine a parking space W as a parking position P for parking the vehicle 1A. For example, the parking position determining unit 134 selects a parking space that is no greater than a preset distance, wherein a distance that has been set in advance, from the vehicle 1A, from those parking spaces that are recorded in the surroundings map without an obstacle having been detected. The parking position determining unit 134 determines a parking position P by setting a location and an angle for parking the vehicle 1A within the selected parking space.

Figure 2:
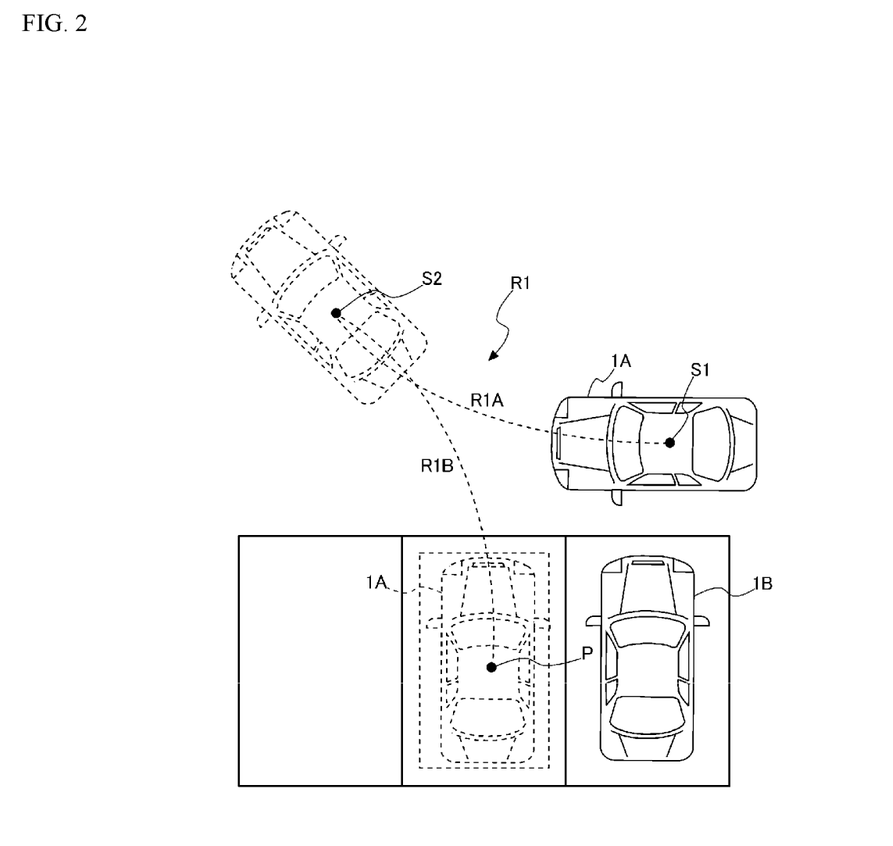
FIG. 2 is a diagram showing an example of a first travel route.

FIG. 2 is a diagram showing an example of a first parking route R1.

The route generating unit 135 executes a route generating process to generate a first parking route R1 that is a route by which the vehicle 1A will park in the parking position P. Publicly known means are used in the route generating process. The first parking route R1 generated by the route generating unit 135 is a route to the parking position P that has been determined by the parking position determining unit 134, and, as illustrated in FIG. 2, includes a forward route R1A, an intermediate position S2, and a backward route R1B.

The forward route R1A is a route by which the vehicle 1A travels forward and includes a forward straight travel route and/or a forward turning route. The forward straight travel route is a route wherein the vehicle 1A travels straight forward. The forward turning travel route is a route wherein the vehicle 1A travels forward while turning.

The backward route R1B is a route by which the vehicle 1A travels in backward and includes a backward straight travel route and/or a backward turning route. The backward straight travel route is a route wherein the vehicle 1A travels straight to the rear. The backward turning travel route is a route wherein the vehicle 1A travels to the rear while turning.

The intermediate position S2 is a position wherein the direction of travel of the vehicle 1A switches from forward to backward, where the travel of the vehicle 1A is stopped briefly, a shift operation is carried out, and the direction of travel of the vehicle 1A changes from moving forward to moving in backward.

Moreover, position S1 shown in FIG. 2 is the position wherein the parking assist system 100 generates the first parking route R1 and starts automatic operation along the first parking route R1. In the below, the position S1 will be termed the "starting position S1."

The backward position determining unit 136 determines a backward position. The backward position is a position wherein the route generating unit 135 executes a route generating process and a second parking route R2 is generated.

The second parking route R2 is a new parking route that is generated when information that the vehicle 1A stopped travel midway in the first parking route R1 is acquired through the input/output I/F 110.

The backward position determining unit 136 determines a backward position when conditions A through C, below, are satisfied:

Condition A: During travel of the vehicle 1A along the first parking route R1, the vehicle 1A has stopped midway in the first parking route R1 through a driver operation or through detection of an obstacle through a detection result of the detecting system 20.

Condition B: The stopping position S3 (referencing FIG. 4) where the vehicle 1A has stopped is in the forward route R1A or is the intermediate position S2.

Condition C: At the stopping position S3, a search was made for a new parking route (the second parking route R2), but the search for the second parking route R2 was unsuccessful.

Depending on the stopping position S3, when the vehicle 1A has stopped midway through the forward route R1A, it may not be possible to generate a second parking route R2.

Firstly, if the vehicle 1A has stopped midway in the forward route R1A, it is not possible to generate, as the second parking route R2, a route wherein the vehicle 1A moves forward. This is because the driver has determined that there is an obstacle to the front of the vehicle 1A, or because there has been an evaluation by the detecting system 20 that there is an obstacle to the front of the vehicle 1A.

Figure 3:
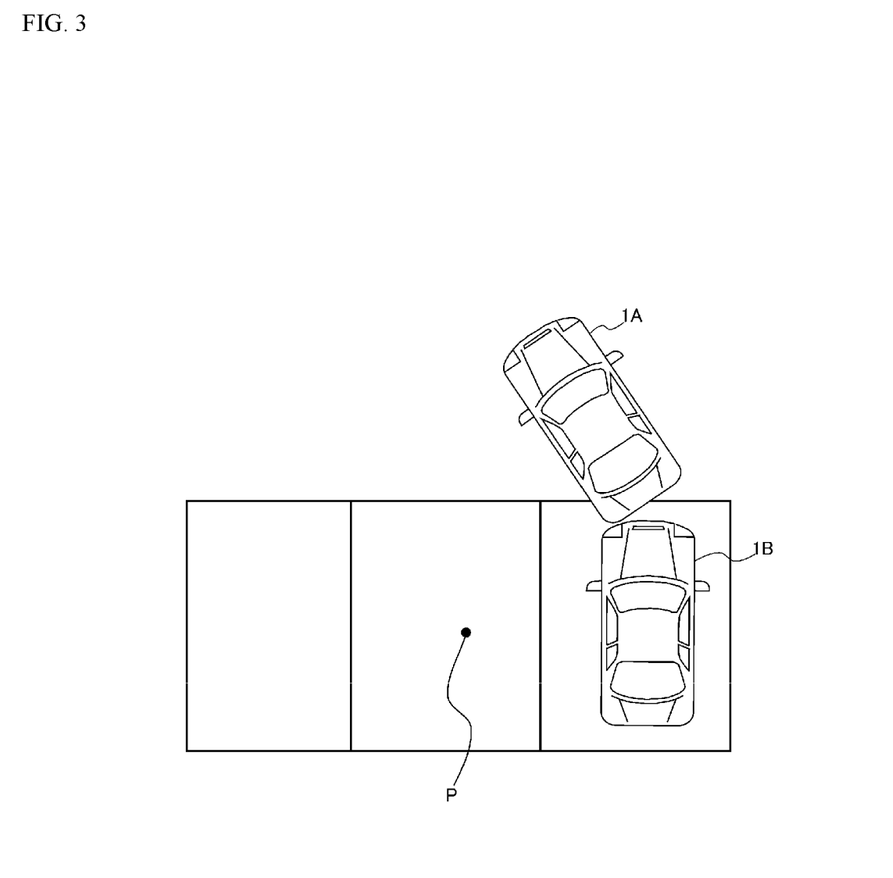
FIG. 3 is a diagram showing a route not used as the second parking route.

FIG. 3 is a diagram showing a route not used as the second parking route.

Let us assume that another vehicle 1B is parked in a parking space that is adjacent to the parking position P, and that there is an occupant in the other vehicle 1B. FIG. 3 shows a case wherein the other vehicle 1B is parked on the right side, in the perspective of the drawing, of the parking position P. In this case, where generating a route wherein the back of the vehicle 1A approaches the front of the other vehicle 1B, as shown in FIG. 3, this may cause the passenger of the other vehicle 1B to worry that the vehicle 1A might not detect the other vehicle 1B, and that the vehicle 1A might collide with the other vehicle 1B.

Because of this, it will not be possible to generate a second parking route R2 by which the back of the vehicle 1A will approach the front of the other vehicle 1B.

Moreover, the forward route R1A, as shown in FIG. 2, is a case of a route wherein the vehicle 1A turns while moving forward (a case wherein the stopping position S3 is further than the starting position S1 from the parking position P). In this case, the sonar data of the sonar unit 40 that is detected at the stopping position S3 may have detection accuracy that is worse than the sonar data that was detected at the starting position S1. This is because the accuracy with which the parking position P and the obstacles in the vicinity thereof are detected is better when the distance between the sonar unit 40 and the parking position P that is the target is short. If the vehicle 1A is farther away than the starting position S1, the reduced detection accuracy of the sonar unit 40 may make it impossible to generate a parking route.

In the backward position determining unit 136, when the conditions A through C, above, are satisfied, the route generating unit 135 executes a route generating process to determine the backward position.

The backward position determining unit 136 determines the backward position using the backward route R1B that is included in the first parking route R1. Using the backward route R1B in determining the backward position reduces the overhead in calculating the new route, making it possible to shorten the time required before parking is completed.

Moreover, the accuracy of detection by the sonar unit 40 can be improved through using the backward route R1B to move the vehicle 1A closer to the parking position P. In particular, the accuracy with which obstacles are detected by the sensor data of the sonar unit 40 is higher to the rear of the vehicle 1A than to the side of the vehicle 1A. This is by design, from the perspective of safety to the rear of the vehicle 1A. Because of this, the accuracy with which obstacles are detected can be improved through using the backward route R1B to move the vehicle 1A so that the back portion of the vehicle 1A will face the parking position P.

First, the backward position determining unit 136 sets the backward route R1B in a surroundings map. The backward position determining unit 136 changes the starting point of the backward route R1B from the intermediate position S2 to the stopping position S3.

That which was generated at the starting position S1 may be used for the surroundings map, or the surroundings map may be generated by acquiring surroundings information again at the stopping position S3.

Figure 4:
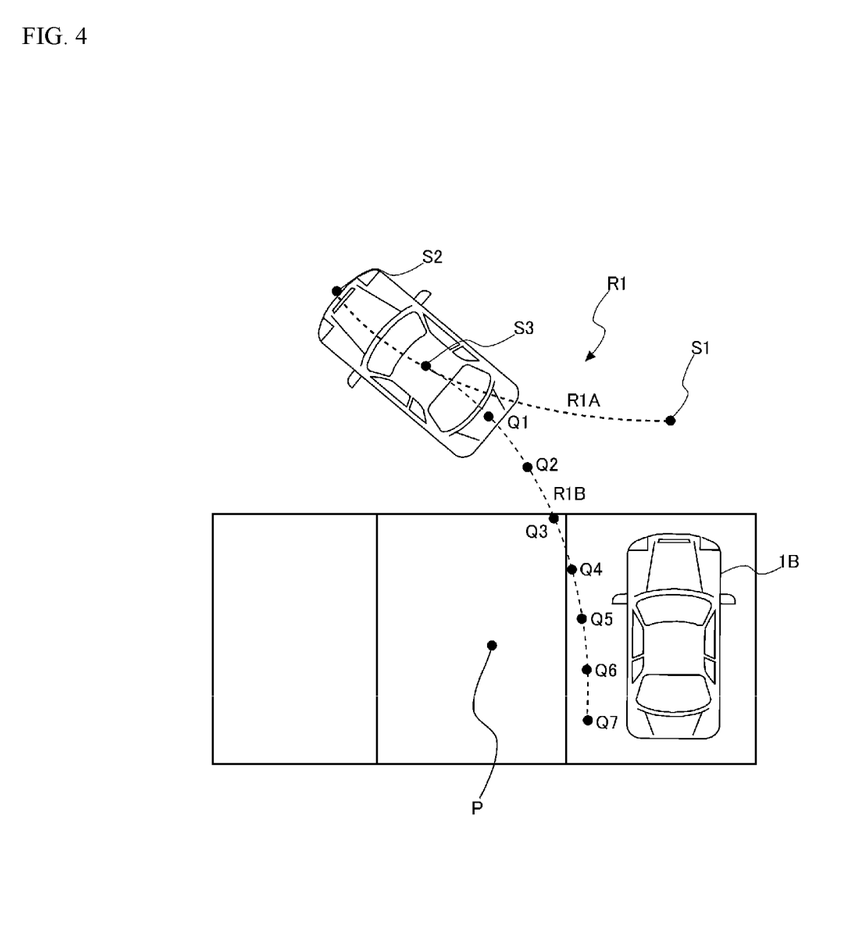
FIG. 4 is a diagram showing a state wherein the starting point for the backward route has been changed to the vehicle stopping position.

FIG. 4 is a diagram showing a plurality of segmenting points Q set in the backward route R1B.

When the stopping position S3 is set as the starting point and the backward route R1B is set in the surroundings map, the backward position determining unit 136 sets a plurality of segmenting points Q on the backward route R1B. For example, the backward position determining unit 136 sets segmenting points Q with set spacing, that has been set in advance, on the backward route R1B. Moreover, if the backward route R1B includes a straight travel route and a turning route, the backward position determining unit 136 sets, on the straight travel route, segmenting points Q with set spacing that has been set for straight travel routes, and sets, on the turning route, segmenting points Q with set spacing that has been set for turning routes. FIG. 4 shows the state wherein seven segmenting points, Q1, Q2, Q3, Q4, Q5, Q6, and Q7, have been set on the backward route R1B.

When the segmenting points Q have been set, the backward position determining unit 136 sequentially selects segmenting points Q for processing, starting with the one that is nearest to the stopping position S3, which is the current position of the vehicle 1A, to evaluate whether or not the distance between the vehicle 1A and an obstacle that exists in the vicinity thereof would be no greater than the setting distance, that has been set in advance, if the vehicle 1A were to move to the selected segmenting point Q. That is, the backward position determining unit 136 evaluates whether or not the distance between the vehicle 1A, after moving, would be no greater than the setting distance if the position of the vehicle 1A on the surroundings map were to be moved to the position of the selected segmenting point Q. This setting distance may be 0 cm, that is, the distance wherein the vehicle 1A would contact or collide with the obstacle.

Upon an evaluation, at one of these plurality of segmenting points Q1, Q2, Q3, Q4, Q5, Q6, and Q7 that have been set, that the distance to the obstacle would be no greater than the setting distance, the backward position determining unit 136 sets the backward position to the segmenting point Q that is one prior to the segmenting point Q wherein it was evaluated that the distance would be no greater than the setting distance. The "segmenting point Q that is one prior" is the segmenting point Q that is adjacent to the segmenting point Q for which the process is performed that is the segmenting point Q that is nearer to the stopping position S3 than the segmenting point Q for which the process is performed.

Additionally, upon evaluation that the distance to the obstacle at none of the plurality of segmenting points Q1, Q2, Q3, Q4, Q5, Q6, and Q7 that have been set would be at least the set distance, the backward position determining unit 136 sets the position at the end of the backward route R1B (the position of Q7) as the backward position.

Figure 5:
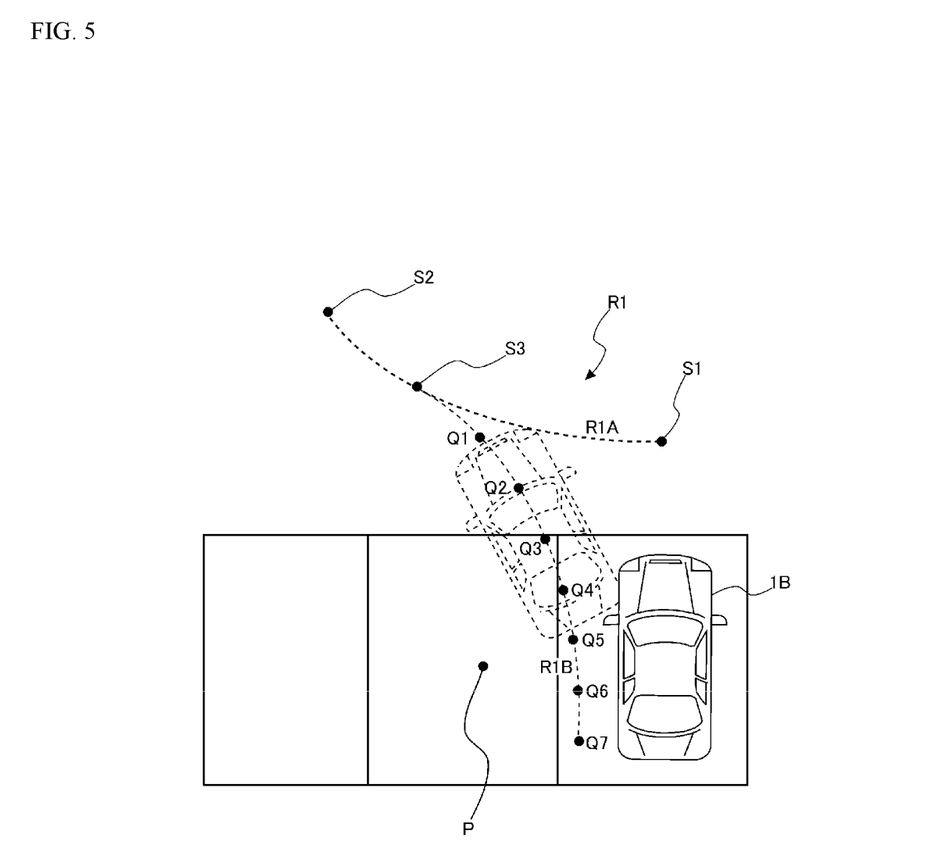
FIG. 5 is a diagram showing a state wherein a vehicle that has moved to a segmenting point would have collided with an obstacle.

FIG. 5 is a diagram showing a state wherein the vehicle 1A that has moved to a segmenting point Q3 would have collided with an obstacle.

Figure 6:
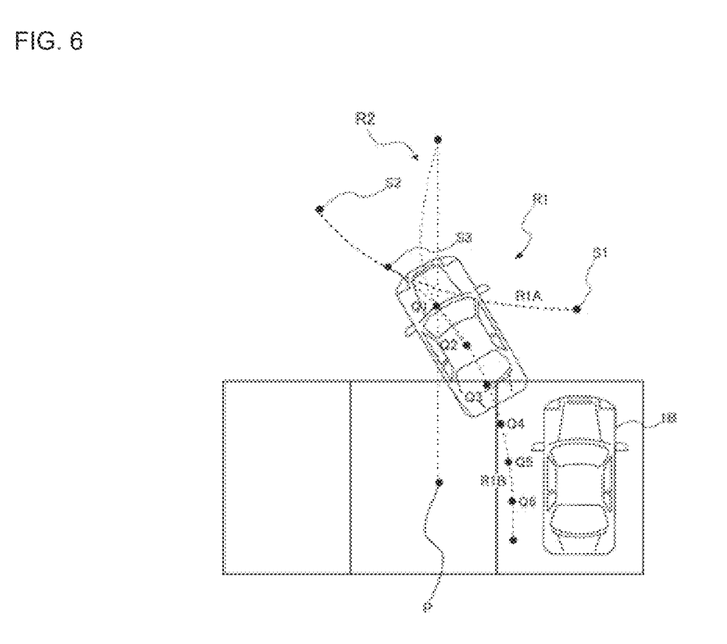
FIG. 6 is a diagram showing a state wherein a vehicle has moved to a determined stopping position.

Moreover, FIG. 6 shows the state wherein the backward position is set to the segmenting point Q2 that is the segmenting point Q that is one prior to the segmenting point Q3 at which the distance to the obstacle would be no greater than the setting distance.

When the backward position has been determined, the backward position determining unit 136 generates a travel route for the vehicle 1A to travel from the stopping position S3 to the segmenting point Q2 that is the backward position, and outputs, to the control information generating unit 137, information for the travel route that has been generated. At least a portion of the backward route R1B is used in this travel route.

In the present specification, the route by which the vehicle 1A travels to the parking position P shall be termed the "parking route," and a route by which the vehicle 1A moves to a position other than the position P shall be termed a "travel route."

Information for the parking route, travel route, or the like, is inputted into the control information generating unit 137. The information for the first parking route R1, described above, and information for the second parking route R2, described below, are included in the parking route information.

The control information generating unit 137 generates control information, for execution by the vehicle controlling unit 70, based on the inputted information for the first parking route R1 or information for the travel route. When the information for the first parking route R1 has been inputted from the route generating unit 135, the control information generating unit 137 generates control information for the vehicle 1A to travel according to the first parking route, and outputs the generated control information to the input/output I/F 110. The control information is information for controlling the vehicle controlling unit 70, the steering system 81, the power system 83, the braking system 85, and the transmission system 87. Additionally, upon inputting of the information for the travel route from the backward position determining unit 136, the control information generating unit 137 generates control information for the vehicle 1A to travel according to the travel route, and outputs the generated control information to the input/output I/F 110. The control information generating unit 137 outputs the generated control information to the vehicle controlling unit 70 through the input/output I/F 110.

The vehicle 1A travels from the stopping position S3 to the backward position through the vehicle controlling unit 70 controlling the driving system 80 by the control information that corresponds to the travel route.

Upon completion of controlling of the driving system 80 in accordance with the control information, the vehicle controlling unit 70 outputs, to the parking assist system 100, a completion notification for the control.

When a completion notification has been inputted from the vehicle controlling unit 70, the route generating unit 135 evaluates whether or not the vehicle 1A has arrived at the backward position, based on the location information and azimuth information inputted from the position detecting unit 10.

Upon evaluation that the vehicle 1A has arrived at the backward position, the route generating unit 135 carries out a route generating process to generate a second parking route R2 based on the surroundings map newly generated by the surroundings map generating unit 133.

If the route generating unit 135 is able to generate the second parking route R2 through the route generating process, it outputs the generated information for the second parking route R2 to the control information generating unit 137. If the route generating unit 135 is not able to generate the second parking route R2 despite executing the route generating process, an indication the parking route could not be generated is displayed on the display unit 50.

Figure 7:
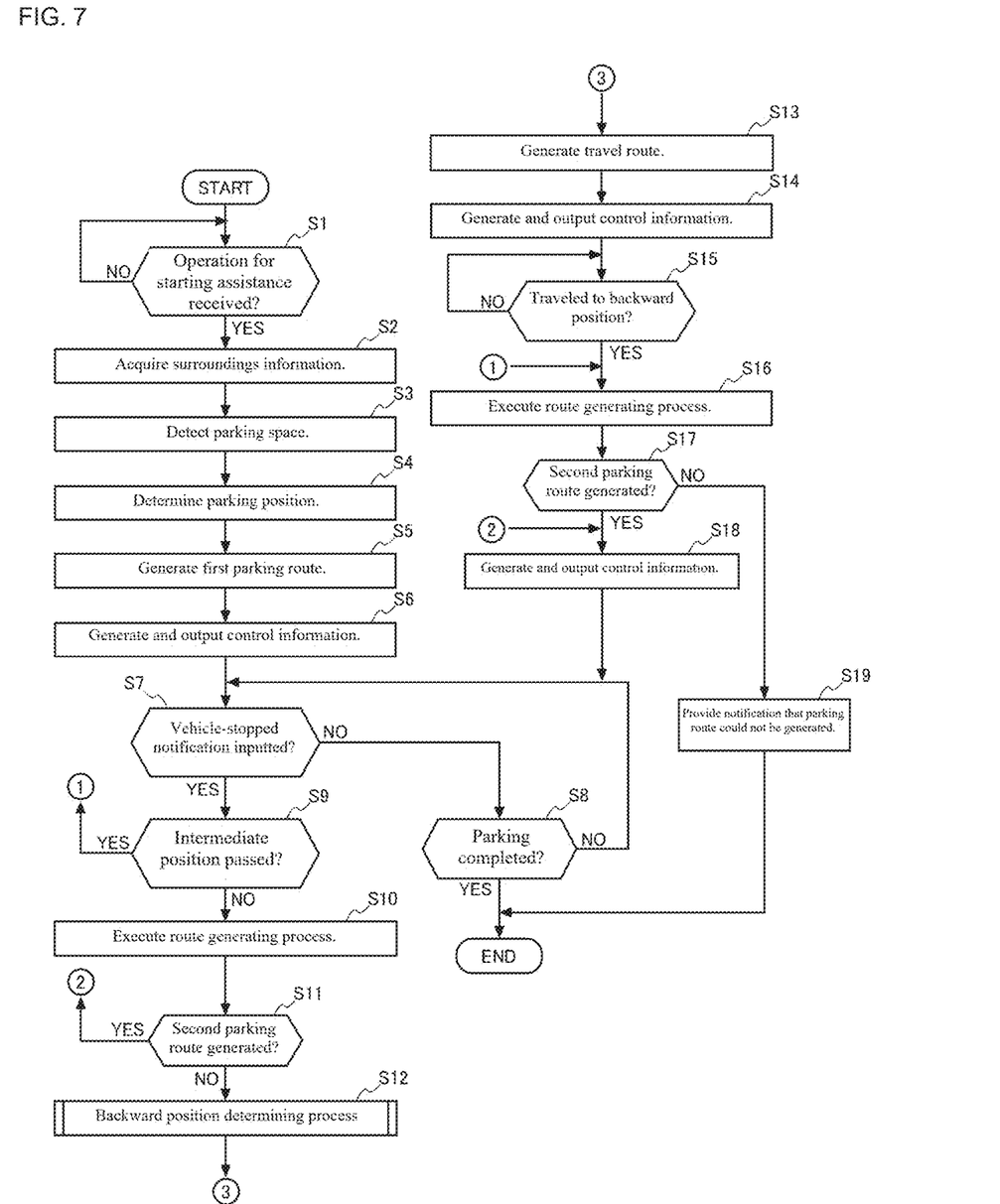
FIG. 7 is a diagram showing the range of a vehicle when the vehicle is positioned at a segmenting point.
Figure 8:
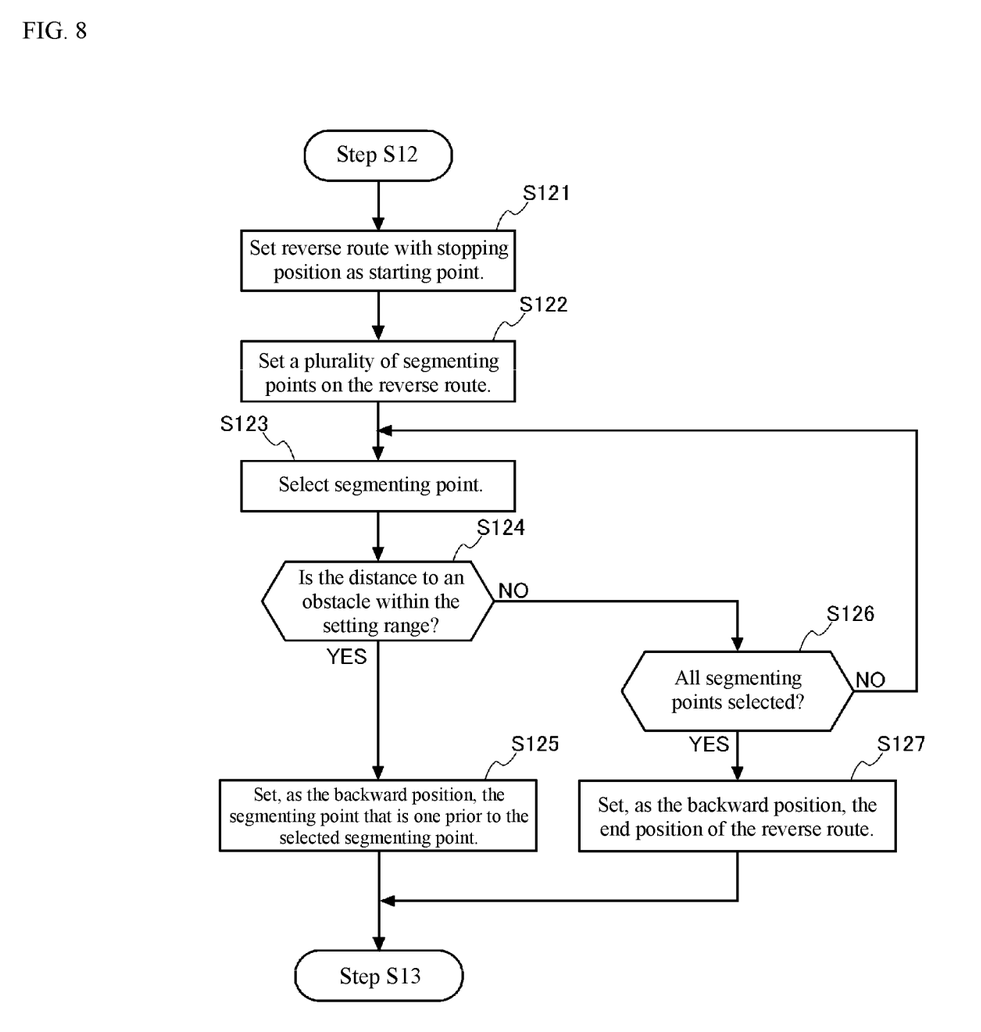
FIG. 8 is a flowchart showing the operation of the parking assist system.

FIG. 7 and FIG. 8 are flowcharts showing the operation of the parking assist system 100. The operation of the parking assist system 100 will be explained in reference to FIG. 7 and FIG. 8.

First the parking assist system 100 evaluates whether or not an operation to start the parking assist has been received through a touch operation on the display unit 50 (Step S1). If no operation for starting the parking assist has been received (Step S1/NO), the parking assist system 100 delays the commencement of the next process until receiving the operation for starting.

If an operation for starting the parking assist is received through a touch operation on the display unit 50 (Step S1/YES), the parking assist system 100 acquires, from the detecting system 20, surroundings information that is information for the surroundings of the vehicle 1A (Step S2). Step S2 corresponds to the "acquiring step." Based on the surroundings information that is acquired, the parking assist system 100 detects a parking W wherein the vehicle 1A can be parked (Step S3).

The parking assist system 100 sets the angle and position for when the vehicle 1A is to be parked in the parking space, to determine the parking position P for parking the vehicle 1A (Step S4). Step S4 corresponds to the "determining step." The parking assist system 100 generates a first parking route R1 for the vehicle 1A to travel from the starting position S1, where the vehicle 1A is positioned, to the parking position P that has been (Step S5). Step S5 corresponds to the "route generating step."

Next the parking assist system 100 generates control information corresponding to the generated first parking route R1, and outputs the generated control information to the vehicle controlling unit 70 (Step S6). Step S6 corresponds to the "control information generating step" and the "outputting step."

The parking assist system 100 next evaluates whether or not a stopped notification, which provides notification that travel of the vehicle 1A has stopped midway in the first parking route R1, has been inputted from the vehicle controlling unit 70 (Step S7). If no stopped notification has been inputted (Step S7/NO), the parking assist system 100 evaluates whether or not parking at the parking position P has been completed (Step S8). The parking assist system 100 evaluates whether or not parking at the parking position P has been completed based on the completion notification that is inputted from the vehicle controlling unit 70 when parking at the parking position P has been completed, and on location information and azimuth information inputted from the position acquiring unit 131. If a completion notification has been inputted from the vehicle controlling unit 70 and the location information inputted from the position acquiring unit 131 is the parking position P, the parking assist system 100 evaluates that parking has been completed.

If parking at the parking position P has been completed (Step S8/YES), the parking assist system 100 terminates this process flow.

Conversely, if parking at the parking position P has not been completed (Step S8/NO), the parking assist system 100 returns to the evaluation of Step S7, and evaluates whether or not a stopped notification has been inputted from the vehicle controlling unit 70 (Step S7).

When a stopped notification is inputted from the vehicle controlling unit 70 (Step S7/YES), the parking assist system 100 evaluates whether or not the vehicle 1A has passed through the intermediate position S2 (Step S9). If the vehicle 1A has passed through the intermediate position S2 and then stopped (Step S9/YES), the parking assist system 100 executes a route generating process for generating the second parking route R2 (Step S16), and evaluates whether or not the second parking route R2 can be generated (Step S17).

If the second parking route R2 cannot be generated (Step S17/NO), the parking assist system 100 displays, on the display unit 50, that the second parking route R2 could not be generated. Moreover, when the second parking route R2 has been generated (Step S17/YES), the parking assist system 100 generates control information corresponding to the generated second parking route R2, and outputs the generated control information to the vehicle controlling unit 70 (Step S18). The parking assist system 100 then moves to the evaluation in Step S7.

Upon evaluation that the vehicle 1A did not pass through the intermediate position S2 (Step S9/NO), the parking assist system 100 executes a route generating process for generating the second parking route R2 (Step S10), and evaluates whether or not the second parking route R2 can be generated (Step S11).

When the second parking route R2 has been generated (Step S11/YES), the parking assist system 100 generates control information corresponding to the generated second parking route R2, and outputs the generated control information to the vehicle controlling unit 70 (Step S18). The parking assist system 100 then moves to the evaluation in Step S7.

Conversely, if the second parking route R2 cannot be generated (Step S11/NO), the parking assist system 100 executes the backward position determining process (Step S12). The details of Step S12 will be explained in reference to the flowchart of FIG. 8. Step S12 corresponds to the "identifying step."

Upon determination of the backward position by the backward position determining process, the parking assist system 100 generates a travel route by which the vehicle 1A is to travel to the backward position that has been determined (Step S13). At least a portion of the backward route R1B is used in this travel route. The parking assist system 100 generates control information corresponding to the travel route that has been generated, and outputs the generated control information to the vehicle controlling unit 70 (Step S14). Step S14 corresponds to the "control information generating step."

The parking assist system 100 next evaluates whether or not travel of the vehicle 1A to the backward position that has been determined has been completed (Step S15). If a completion notification that travel has been completed has been inputted from the vehicle controlling unit 70 and the position indicated by the location information inputted from the position acquiring unit 131 is the backward position, the parking assist system 100 evaluates that movement to the backward position has been completed. If movement of the vehicle 1A to the backward position has not been completed (Step S15/NO), the parking assist system 100 does not move on to the next step until there is an evaluation that movement of the vehicle 1A has been completed.

Upon completion of travel to the backward position (Step S15/YES), the parking assist system 100 acquires the surroundings information again at the backward position that has been reached, and executes a route generating process for generating the second parking route R2 based on the surroundings information that has been acquired (Step S16). Step S16 corresponds to the "route generating step." Additionally, the parking assist system 100 evaluates whether or not a second parking route R2 was generated (Step S17). If the second parking route R2 cannot be generated (Step S17/NO), the parking assist system 100 displays, on the display unit 50, that the second parking route R2 could not be generated (Step S19). Moreover, when the second parking route R2 has been generated (Step S17/YES), the parking assist system 100 generates control information corresponding to the generated second parking route R2, and outputs the generated control information to the vehicle controlling unit 70 (Step S18). The parking assist system 100 then moves to the evaluation in Step S7.

FIG. 8 is a flowchart showing the details for Step S12.

First the parking assist system 100 sets the backward route R1B on the surroundings map (Step S121). In this case, the parking assist system 100 changes the starting point for the backward route R1B from the intermediate position S2 to the stopping position S3.

The parking assist system 100 next sets a plurality of segmenting points Q on the backward route R1B that has been set on the surroundings map (Step S122).

The parking assist system 100 next selects, to be subject to processing, one of the segmenting points Q that has been set (Step S123). The parking assist system 100 selects, to be subject to processing, the segmenting points Q sequentially, starting from the one nearest to the stopping positions S3.

When a segmenting point Q has been selected, the parking assist system 100 evaluates whether or not the distance between the vehicle 1A and an obstacle would be at least the setting distance, set in advance, if the vehicle 1A were to travel to the selected segmenting point Q (Step S124).

If the distance between the vehicle 1A and an obstacle would be no greater than the setting distance (Step S124/NO), the parking assist system 100 evaluates whether or not selection of all of the segmenting points Q that have been set on the backward route R1B as being subject to processing has been completed (Step S126). If the evaluation is that all of the segmenting points Q have been selected as being subject to processing (Step S126/YES), the parking assist system 100 determines the backward position to be the position of the end of the backward route R1B that is set on the surroundings map (Step S127).

Conversely, if not all of the segmenting points Q have been selected as being subject to processing (Step S126/NO), the parking assist system 100 selects the next segmenting point Q to be selected to be subject to processing (Step S123). The parking assist system 100 selects the segmenting point Q for which the distance from the stopping positions S3 is adjacent to the segmenting point Q that has already been selected, that is the segmenting point Q for which the distance from the stopping position S3 is next farther than the segmenting point Q that has already been selected. When a segmenting point Q has been selected, the parking assist system 100 evaluates whether or not the distance between the vehicle 1A and an obstacle would be at least the setting distance, set in advance, if the vehicle 1A were to travel to the selected segmenting point Q (Step S124).

Additionally, if the evaluation is that the distance between the segmenting point Q that is subject to processing and an obstacle would be no greater than the setting distance (Step S124/YES), the parking assist system 100 sets, as the backward position, the segmenting point Q that is adjacent to the segmenting point Q that is subject to this process and that is the segmenting point Q that is one nearer to the stopping positions S3 than the segmenting point Q that is subject to the process (Step S125).

As explained above, the parking assist system 100 according to the present embodiment comprises an input/output I/F 110, a state acquiring unit 132, a parking position determining unit 134, a route generating unit 135, a control information generating unit 137, and a backward position determining unit 136.

The input/output I/F 110 is connected to the position detecting unit 10, the detecting system 20, and the vehicle controlling unit 70, which are outside devices. The input/ output I/F 110 acquires information from these outside systems and outputs information to the outside systems.

The state acquiring unit 132 acquires, through the input/output I/F 110, the state of surroundings of the vehicle 1A and location information for the vehicle 1A.

The parking position determining unit 134 determines the parking position P for parking the vehicle 1A, based on the acquired state of surroundings of the vehicle 1A.

The route generating unit 135 generates the first parking route R1, which includes the forward route R1A and the backward route R1B, for the vehicle 1A to travel to the parking position P that has been determined by the parking position determining unit 134.

The control information generating unit 137 generates control information for the vehicle 1A to travel in accordance with the first parking route R1, and outputs the generated control information to the input/output I/F 110.

The backward position determining unit 136, upon inputting, through the input/output the I/F 110, a notification that travel of the vehicle 1A has stopped in the forward route R1A, changes the starting point of the backward route R1B to the stopping position S3 where travel of the vehicle 1A stopped, and if the vehicle 1A has moved along the backward route R1B wherein the starting point was changed to the stopping position S3, the vehicle 1A determines a backward position where backward is possible.

The control information generating unit 137 generates control information for causing the vehicle 1A to travel from the stopping position S3 to the backward position.

Upon the vehicle 1A traveling to the backward route R1B, the route generating unit 135 executes, based on the state of surroundings acquired by the state acquiring unit 132, generation of the second parking route R2 by which the vehicle 1A is to move to the parking position P.

Because of this, if the second parking route R2 cannot be generated at the stopping position S3, the vehicle 1A travels to the backward point and executes generation of the second parking route R2, thus improving the generating ratio of the second parking route R2.

Moreover, the time required for travel of the vehicle 1A can be shortened, by not carrying out calculating processes such as calculating the route, through the use, in the route by which the vehicle 1A is to travel, of at least a portion of the backward route R1B that has been generated by the first parking route R1.

The backward position determining unit 136 sets a plurality of segmenting points Q at predetermined interval in the backward route R1B that was changed to the stopping position S3, and evaluates whether or not the vehicle 1A would collide with an obstacle if the vehicle 1A were to move to a segmenting point Q that is set.

If the backward position determining unit 136 detects a segmenting point Q that has been evaluated having a collision with an obstacle, the backward position determining unit 136 specifies, as the backward position, the segmenting point Q that is adjacent to the segmenting point Q that was detected and that is at the position that is nearer to the stopping position S3 than the segmenting point Q that was detected.

Being as close as possible to the parking position P can increase the detection accuracy in the sensor data of the sonar unit 40 acquired by the state acquiring portion 132 as the state of surroundings of the vehicle 1A.

Because of this, it is possible to increase the generation ratio of the second parking route R2 by detecting the parking position and the surroundings information with high accuracy through having the rear of the vehicle 1A be near to the parking position P, without the vehicle 1A coming into contact with the obstacle.

Moreover, in the sonar unit 40 the sonar provided toward the rear of the vehicle 1A has higher detection accuracy than the sonars that are provided toward the sides of the vehicle 1A. Because of this, it is possible to further improve the detection accuracy of the parking position and the information for the surroundings thereof by having the rear of the vehicle 1A be near the parking position P.

If no segmenting point Q evaluated as having a collision with an obstacle is detected, the backward position determining unit 136 determines the end position of the backward route R1B as the backward position.

It is possible to increase the generation ratio of the second parking route R2 by detecting the parking position and the surroundings information with high accuracy through having the rear of the vehicle 1A be near to the parking position P, without the vehicle 1A coming into contact with the obstacle.

The route generating unit 135 carries out generation of the second parking route R2 at the stopping position S3.

The backward position determining unit 136 begins determination of the backward position upon inputting of notification that the route generating unit 135 is unable to generate the second parking route R2 at the stopping position S3.

This makes it possible to determine the backward position at which the vehicle 1A is to reverse if these second parking route R2 cannot be generated at the stopping position S3.

The embodiment set forth above is no more than an illustration of one form of the present invention, and the present invention may be modified and applied appropriately in a range that does not deviate from the spirit and intent thereof.

For example, in the embodiment set forth above, when the second parking route R2 could not be generated at the stopping position S3, the backward position determining unit 136 determined a stopping position S3, and the vehicle 1A traveled to the stopping position S3 that was determined.

In the parking assist system 100, if the vehicle 1A has stopped midway in the forward route R1A, rather than executing generation of the second parking route R2 at the stopping position S3, a stopping position S3 may be determined and the second parking route R2 may be generated after the vehicle 1A has traveled to the stopping position S3 that has been determined.

Because the rear of the vehicle 1A will be closer to the parking position P when at the backward position than when at the stopping position S3, this enables more accurate data regarding the obstacles to be obtained by the sonar unit 40. This is to enable an improvement in the generation ratio for the second parking route R2 and to enable an improvement in the parking accuracy when parking at the parking position P.

Moreover, while the block diagram showing a structure for the parking assist system 100 shown in FIG. 1 is a schematic diagram wherein the structural elements are partitioned depending on the main processing details, to facilitate understanding, the structural elements may be partitioned into more structural elements depending on the details of the processes. Moreover, the partitioning may be such that more processes are carried out by a single structural element.

Moreover, in FIG. 1 the parking assist system 100 may be structured integrally with the position detecting unit 10 and/or a detecting system 20.

Moreover, when the parking assist method according to the present invention is achieved using a computer, it may be structured in the form of a medium for recording a program that is to be executed on the computer or a transmission medium for transmitting the program. The recording medium may use a magnetic or optical recording medium, or a semiconductor memory device. Specifically, it may be a fixed recording medium or a portable recording medium such as a flexible disk, an HDD (Hard Disk Drive) a CD-ROM (Compact Disk Read-Only Memory), a DVD, a Blu-ray® Disc, a magnetooptical disc, a flash memory, a card-type recording medium, or the like. Moreover, the recording medium may instead be a non-volatile storage device, such as a ROM, an HDD, or the like, provided with the parking assist system 100.

Moreover, the processing unit in the flowcharts shown in FIG. 7 and FIG. 8 are partitioned depending on the main processing units to facilitate easy understanding of the processes of the parking assist system 100, but the present invention is not limited by the names and ways in which the processing units are divided. The processes of the parking assist system 100 may be divided into more processing units depending on the process details. Moreover, the processes of the parking assist system 100 may instead be divided so as to include more processes in a single processing unit.

EXPLANATION OF REFERENCE SYMBOLS

1A: Vehicle
3: Onboard System
5: Communication Bus
10: Position Detecting Unit
20: Detecting System
30: Imaging Unit
31: Front Camera
32: Rear Camera
33: Left Side Camera
34: Right Side Camera
40: Sonar Unit
50: Display Unit
51: Display Panel
53: Touch Sensor
70: Vehicle Controlling Unit
80: Driving System
81: Steering System
83: Power System
85: Braking System
87: Transmission System
100: Parking Assist System
110: Input/Output I/F
120: Memory
130: Processor
131: Position Acquiring Unit
132: State Acquiring Unit
133: Surroundings Map Generating Unit
134: Parking Position Determining Unit
235: Route Generating Unit
136: Position Determining Unit
137: Control Information Generating Unit
P: Parking Position
Q: Segmenting Point
S1: Starting Position
S2: Intermediate Position
S3: Stopping Position

What is claimed is:

1. A parking assist system comprising:
a processor,
wherein the processor includes:
a state acquiring unit configured to acquire surroundings information and location information for a vehicle from one or more external devices through an input/output interface configured to connect to the one or more external devices, the surroundings information indicating a state of surroundings of the vehicle;
a parking position determining unit configured to determine a parking position for parking the vehicle based on the surroundings information acquired by the state acquiring unit;
a route generating unit configured to generate a first parking route, including a forward route and an initial backward route, by which the vehicle is to move from a starting position to the parking position determined by the parking position determining unit;
a control information generating unit configured to generate control information for the vehicle to travel according to the first parking route, and output the generated control information to the input/output interface; and
a backward position determining unit configured to:
change a starting point of the initial backward route from an intermediate position to a stopping position wherein the travel of the vehicle is stopped when a notification that travel of the vehicle has stopped in the forward route has been input through the input/output interface,
set a partial backward route that is the initial backward route in which the starting point of the initial backward route was changed from the intermediate position to the stopping position, wherein an entirety of the partial backward route has a same path shape as the initial backward route, and
determine, on the partial backward route, a backward position wherein the vehicle can be reversed when the vehicle is moved along the partial backward route, wherein:
the control information generating unit generates control information for moving the vehicle from the stopping position to the backward position; and
when the vehicle has traveled to the backward position, the state acquiring unit reacquires the surroundings information at the backward position, and the route generating unit executes generation of a second parking route, by which the vehicle is to move from the backward position to the parking position, based on the surroundings information at the backward position reacquired by the state acquiring unit.

2. The parking assist system according to claim 1, wherein:
the backward position determining unit sets a plurality of segmenting points at a predetermined interval, in the partial backward route wherein the starting point was changed from the intermediate position to the stopping position, and evaluates whether the vehicle would collide with an obstacle if the vehicle were to move to each of the segmenting points; and
upon detection of a segmenting point of the plurality of segmenting points evaluated as colliding with the obstacle, the backward position determining unit determines, as the backward position, the segmenting point that is adjacent to the detected segmenting point and that is positioned nearer to the stopping position than the detected segmenting point.

3. The parking assist system according to claim 2, wherein:

upon no detection of the segmenting point of the plurality of segmenting points evaluated as colliding with the obstacle, the backward position determining unit determines, as the backward position, an end position of the partial backward route wherein the starting point was changed from the intermediate position to the stopping position.

4. A method of performing a parking assist by a parking assist system including a processor, the method comprising:

acquiring surroundings information and vehicle location information, the surroundings information indicating a state of surroundings of a vehicle;

determining a parking position for parking the vehicle based on the surroundings information acquired for the vehicle;

generating a first parking route, including a forward route and an initial backward route, by which the vehicle is to move to the determined parking position;

generating control information for the vehicle to travel according to the first parking route;

outputting the generated control information to an input/output interface;

changing a starting point of the initial backward route from an intermediate position to a stopping position wherein the travel of the vehicle is stopped when a notification that travel of the vehicle has stopped in the forward route has been input through the input/output interface;

setting a partial backward route that is the initial backward route in which the starting point of the initial backward route was changed from the intermediate position to the stopping position, wherein an entirety of the partial backward route has a same path shape as the initial backward route;

identifying, on the partial backward route, a backward position wherein the vehicle can be reversed when the vehicle is moved along the partial backward route; and generating control information for moving the vehicle from the stopping position to the backward position, wherein:

when the vehicle has traveled to the backward position, reacquiring the surroundings information at the backward position, and executing generation of a second parking route, by which the vehicle is to move from the backward position to the parking position, based on the surroundings information reacquired at the backward position.

5. The method according to claim 4, wherein:

setting the partial backward route includes setting a plurality of segmenting points at a predetermined interval, in the partial backward route wherein the starting point was changed from the intermediate position to the stopping position, and evaluating whether the vehicle would collide with an obstacle if the vehicle were to move to each of the segmenting points; and upon detection of a segmenting point of the plurality of segmenting points evaluated as colliding with the obstacle, determining, as the backward position, the segmenting point that is adjacent to the detected segmenting point and that is positioned nearer to the stopping position than the detected segmenting point.

6. The method according to claim 5, wherein:

upon no detection of the segmenting point of the plurality of segmenting points evaluated as colliding with the obstacle, determining, as the backward position, an end position of the partial backward route wherein the starting point was changed from the intermediate position to the stopping position.

* * * * *